(12) United States Patent  
Wunder et al.

(10) Patent No.: US 11,603,933 B2  
(45) Date of Patent: Mar. 14, 2023

(54) RADIAL SHAFT SEAL

(71) Applicant: KACO GmbH + Co. KG, Kirchardt (DE)

(72) Inventors: Wilhelm Wunder, Ilsfeld (DE); Konstantin Rempel, Heilbronn (DE)

(73) Assignee: KACO GmbH + Co. KG, Kirchardt (DE)

( * ) Notice: Subject to any disclaimer, the term of this patent is extended or adjusted under 35 U.S.C. 154(b) by 167 days.

(21) Appl. No.: 16/848,972

(22) Filed: Apr. 15, 2020

(65) Prior Publication Data

US 2020/0332898 A1 Oct. 22, 2020

(30) Foreign Application Priority Data

Apr. 18, 2019 (DE) ...................... 10 2019 002 953.4

(51) Int. Cl.
| | |
|---|---|
| *F16J 15/32* | (2016.01) |
| *F16J 15/3276* | (2016.01) |
| *F16J 15/16* | (2006.01) |
| *F16J 15/3268* | (2016.01) |
| *F16J 15/3204* | (2016.01) |
| *F16J 15/3244* | (2016.01) |

(52) U.S. Cl.
CPC ......... *F16J 15/3276* (2013.01); *F16J 15/164* (2013.01); *F16J 15/3204* (2013.01); *F16J 15/3244* (2013.01); *F16J 15/3268* (2013.01)

(58) Field of Classification Search
CPC ........................... F16J 15/3204; F16J 15/3244
See application file for complete search history.

(56) References Cited

U.S. PATENT DOCUMENTS

| | | | | |
|---|---|---|---|---|
| 3,497,225 | A | * | 2/1970 | Workman ................ F16J 15/32 134/67 |
| 3,726,211 | A | * | 4/1973 | Gladwin .............. F16J 15/3244 277/353 |
| 3,868,105 | A | * | 2/1975 | Bentley ................ F16J 15/3244 277/559 |
| 3,934,888 | A | * | 1/1976 | Lutz ..................... F16J 15/3244 277/568 |

(Continued)

FOREIGN PATENT DOCUMENTS

| | | |
|---|---|---|
| CN | 202971924 | 6/2013 |
| JP | 2004068889 | 3/2004 |
| WO | 2006/062929 | 6/2006 |

*Primary Examiner* — Eugene G Byrd  
*Assistant Examiner* — L. Susmitha Koneru  
(74) *Attorney, Agent, or Firm* — Gudrun E. Huckett

(57) ABSTRACT

A radial shaft seal for a shaft to be sealed operating at high rotational speeds and circumferential speeds in both rotational directions has a sealing lip with a first circumferential ring and a second circumferential ring. The first circumferential ring is resting seal-tightly against the shaft to be sealed and seals the medium side. At the side of the first circumferential ring facing the air side, there are first return elements that convey leakage medium back to the medium side. The second circumferential ring is provided at the side of the first circumferential ring facing the air side and second return elements are provided at its air side. The second return elements guide medium that has passed underneath the second circumferential ring back underneath the second circumferential ring to the medium side.

19 Claims, 4 Drawing Sheets

(56) References Cited

U.S. PATENT DOCUMENTS

| | | | | |
|---|---|---|---|---|
| 3,984,113 | A * | 10/1976 | Bentley | F16J 15/3244 277/577 |
| 4,052,502 | A * | 10/1977 | Clark | F16J 15/3244 264/293 |
| 4,084,826 | A * | 4/1978 | Vossieck | F16J 15/3244 277/559 |
| 4,183,543 | A | 1/1980 | Antonini | |
| 5,002,289 | A * | 3/1991 | Yasui | F16J 15/3244 277/559 |
| 5,511,886 | A * | 4/1996 | Sink | F16J 15/3244 277/568 |
| 5,645,283 | A * | 7/1997 | Drucktenhengst | F16J 15/324 277/568 |
| 5,649,710 | A * | 7/1997 | Kanda | F16J 15/3244 277/420 |
| 6,276,691 | B1 * | 8/2001 | Nishigaki | F16J 15/3244 264/161 |
| 6,726,211 | B1 * | 4/2004 | Kuroki | F16J 15/3244 277/560 |
| 8,413,995 | B2 * | 4/2013 | Matsui | F16J 15/3244 277/559 |
| 9,709,173 | B2 * | 7/2017 | Kurth | F16J 15/3244 |
| 10,641,395 | B2 * | 5/2020 | Miura | F16J 15/3232 |
| 2003/0230852 | A1 * | 12/2003 | Bengoa | F16J 15/3244 277/402 |
| 2006/0071430 | A1 * | 4/2006 | Downes | F16J 15/3252 277/549 |
| 2007/0187905 | A1 * | 8/2007 | Berdichevsky | F16J 15/3244 277/559 |
| 2011/0095486 | A1 * | 4/2011 | Nakagawa | F16J 15/3244 277/549 |
| 2019/0277403 | A1 * | 9/2019 | Sakano | F16J 15/3256 |

* cited by examiner

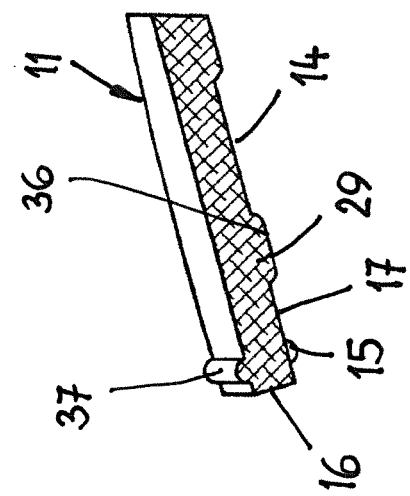
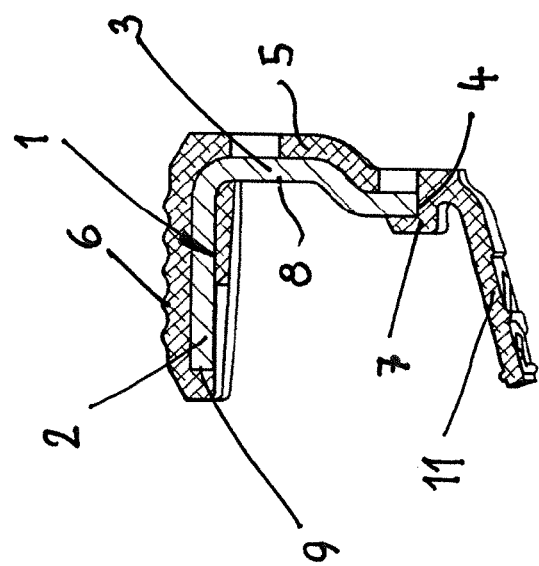
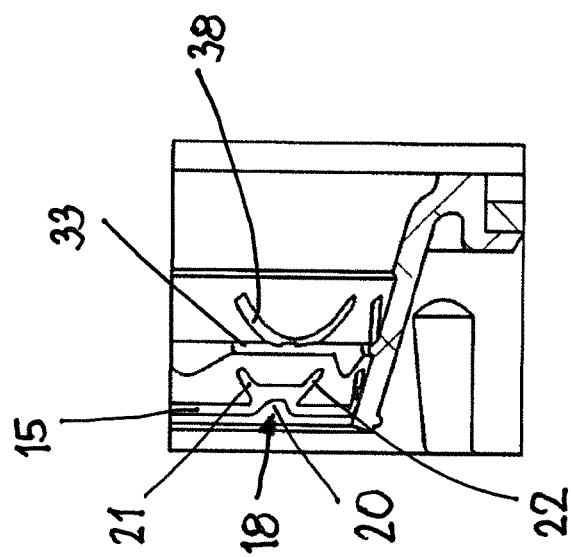
Fig. 9
Fig. 8
Fig. 7

RADIAL SHAFT SEAL

BACKGROUND OF THE INVENTION

The invention concerns a radial shaft seal with at least one sealing lip of elastomeric material which, at its inner side facing the shaft to be sealed, comprises a first circumferential ring that rests seal-tightly against the shaft and seals relative to the medium side; return elements arranged about the circumference of the sealing lip, wherein the return elements are provided at the side of the first ring facing the air side and convey leakage medium to the medium side independent of the rotational direction of the shaft; and at least one second circumferential ring that is provided at the side of the first ring facing the air side.

Radial shaft seals in the form of radial shaft seal rings are known which are used for sealing rotating shafts. The sealing lip of the radial shaft sealing ring is resting under radial force with a first circumferential ring against the shaft and seals relative to the medium side. Should medium have passed underneath the first ring, it is conveyed by the return elements back to the medium side. The return elements are formed by ribs that extend alternatingly oppositely slanted relative to the circumferential direction of the sealing lip; the ribs are arranged at the sealing lip bottom side and the medium that has escaped is returned by them, depending on the rotational direction of the shaft, to the first ring and conveyed underneath it in the direction toward the oil side. By means of the second ring, a sealing action relative to the air side is provided.

Such radial shaft seal rings cause problems when the shaft is rotating at high rotational speeds or at high circumferential speeds. This is to be understood as rotational speeds of at least 10,000 rpm and circumferential speeds of at least 25 m/s. At such high rotational speeds, the ribs arranged at a slant are not well suited as return elements for reliable return of the medium that has passed underneath the first ring.

The invention has the object to configure the radial shaft seal of the aforementioned kind such that it is suitable for higher rotational speeds as well as higher circumferential speeds of the shaft to be sealed in both rotational directions.

SUMMARY OF THE INVENTION

This object is solved for the radial shaft seal of the aforementioned kind in accordance with the invention in that the second ring comprises additional return elements at its air side.

In the radial shaft seal according to the invention, the second ring is provided with additional (second) return elements at its side which is facing the air side. The additional (second) return elements ensure that medium that has possibly passed underneath the second ring is reliably returned to the medium side by passing underneath the second ring. In combination with the first return elements of the first ring, a very high return efficiency of the radial shaft seal in both rotational directions is additionally provided because the additional (second) return elements prevent the generation of a vacuum (generated by the return elements of the first ring). The return efficiency as well as the pump action of the radial shaft seal is therefore raised to a very high level. The radial shaft seal according to the invention is therefore excellently suitable for use in the high speed range in which the shafts may rotate at rotational speeds of more than 10,000 rpm, preferably rotational speeds in a range of approximately 15,000 rpm up to 50,000 rpm. Such rotational speeds are desired for electric motors in the automotive industry in the field of electromobility. The shaft to be sealed in such cases is the drive shaft of a transmission or the rotor shaft of the electric machine. Such drive shafts have such high rotational speeds not only in forward travel but also in reverse travel. The circumferential speed in the field of electromobility can amount to a multiple of that occurring for conventional transmission shafts and motor shafts of conventionally driven vehicles (internal combustion engines). The radial shaft seal according to the invention fulfills the extreme specifications in relation to high rotational speeds, to high circumferential speeds, and, at the same time, to alternating rotational directions of the shaft to be sealed. The radial shaft seal ensures in these cases a proper sealing action between the medium side and the air side.

The sealing lip of the radial shaft seal according to the invention is comprised advantageously of elastomeric material and lies areally on the shaft to be sealed. The sealing lip is provided with the first return elements of the first ring and second return elements of the second ring.

In order to ensure an optimal return of the medium that has passed underneath the first ring and the second ring, the additional (second) return elements in circumferential direction are advantageously positioned approximately at the level of the return elements of the first ring.

In order to reliably return the medium which has escaped possibly underneath the second ring, the additional (second) return elements advantageously extend at least partially at a slant in circumferential direction of the sealing lip. Due to this slanted course, it is achieved that medium is returned in the direction toward the medium side upon rotation of the shaft to be sealed.

Advantageously, the additional (second) return elements are embodied in a sickle shape. Such return elements can be produced in a simple and inexpensive way and ensure in both rotational directions of the shaft to be sealed a reliable return of the medium in the direction toward the medium side.

In a preferred embodiment, the additional (second) return elements adjoin approximately tangentially the second ring. Thereby, the return action of the medium is assisted in an advantageous way.

In a constructively simple configuration, the additional (second) return elements are formed as one piece together with the second ring.

In an advantageous embodiment, the additional (second) return elements delimit pressure chambers together with the neighboring region of the second ring. Upon return of the medium that has passed underneath the second ring, this medium reaches this pressure chamber which, due to the slanted position of the return elements, tapers toward the second ring in flow direction of the medium to be returned. In this way, such a pressure is generated in the respective pressure chamber that the second ring is minimally flowed across by the medium to be returned and a return mechanism is provided at a defined location.

Preferably, the pressure chambers are positioned at a spacing one after the other in circumferential direction of the radial shaft seal. In this way, a reliable return of the medium is ensured about the entire circumference of the radial shaft seal.

The pressure chambers are advantageously provided at both end regions of the additional return elements. In this context, the pressure chambers of the second return elements taper advantageously in the direction toward each other. In this way, it is achieved that, depending on the rotational direction of the shaft to be sealed, the medium to be returned reaches one or the other pressure chamber.

In an advantageous embodiment, the additional (second) return elements are formed by raised portions at the inner side of the sealing lip facing the shaft.

When the additional (second) return elements are embodied in an advantageous manner mirror-symmetrical in relation to a corresponding axial plane of the radial shaft seal, an optimal return is provided in both rotational directions of the shaft to be sealed.

The return efficiency or pump action is increased in an advantageous manner when the return elements of the first ring and the additional (second) return elements of the second ring extend approximately parallel to each other.

In an advantageous embodiment, the second ring is provided, at its side which is facing the medium side, with bulges that are distributed about its circumference and extend in the direction toward the first ring. Due to the bulges, possible leakage flows are returned again in a targeted and active way to the return elements. The bulges have thus the function of guiding ribs which guide the medium to the return elements.

So that the return of the medium is ensured about the circumference of the sealing lip, the bulges and the depressions are advantageously arranged alternatingly in the circumferential direction of the sealing lip.

The free ends of the return elements of the first ring have advantageously minimal spacing from the bulges. Between the return elements of the first ring and the corresponding side wall of the bulges, small return gaps are formed in this way through which the medium can be guided to the return elements of the first ring.

The subject matter of the application results not only from the subject matter of the individual claims but also from all specifications and features disclosed in the drawings and the description. They are, even if they are not subject matter of the claims, claimed as important to the invention inasmuch as individually or in combination they are novel relative to the prior art.

BRIEF DESCRIPTION OF THE DRAWINGS

Further features of the invention result from the additional claims, the description, and the drawings.

The invention will be explained in more detail with the aid of an embodiment illustrated in the drawing.

FIG. 7 shows the detail H in FIG. 2 in enlarged illustration.

FIG. 8 shows a section along the line VIII-VIII in FIG. 4.

FIG. 9 shows a section along the line IX-IX in FIG. 3 in enlarged illustration.

DESCRIPTION OF PREFERRED EMBODIMENTS

Figure 2:
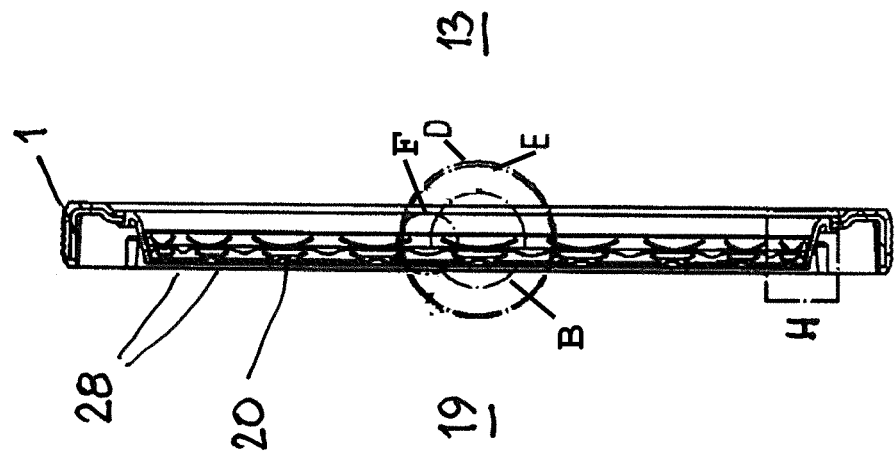
FIG. 2 shows a section along the line II-II in FIG. 1.

The radial shaft seal which is described in the following with the aid of an embodiment is embodied as a radial shaft seal ring. It is used in particular for shafts which in use are subjected to extreme demands in relation to high rotational speeds, high circumferential speeds, and alternating rotational directions. Such demands are in particular posed in the field of electromobility in the automotive industry. Here, electric motors are used whose shafts may have rotational speeds of more than 10,000 rpm. For future devices, already rotational speeds in the range of approximately 15,000 to approximately 50,000 rpm are aimed for. When the shafts of such electric motors are drive shafts of transmissions, the high rotational speeds are not only required for forward travel but also for reverse travel. The radial shaft seal ring described in the following fulfills these specifications.

The radial shaft seal ring has a ring-shaped housing 1 with L-shaped cross section. It has a cylindrical wall 2 (FIG. 8) that is passing at one end into a radially inwardly oriented bottom 3. It is centrally provided with a through opening 4 for the shaft to be sealed. The housing can be comprised of metallic material but also of a hard plastic material.

The bottom 3 is provided at its outer side with a cover 5 which is also completely or partially covering the wall 2 at the radial outer side. The part of the cover 5 which is covering the wall 2 forms in the installed position a static seal of the radial shaft seal ring. Advantageously, the part of the cover 5 which covers the wall 2 is provided with a profiling 6 which projects past the wall 2 and is compressed elastically upon insertion of the radial shaft seal ring into a receiving space. In this way, a proper static sealing action is ensured. The wall 2 of the housing 1 is seated with press fit in the installation space for the radial shaft seal ring.

The cover 5 surrounds also the rim 7 of the through opening 4 and extends across a portion of the inner side 8 of the housing bottom 3. Also, the cover 5 covers advantageously the end face 9 of the wall 2.

Figure 1:
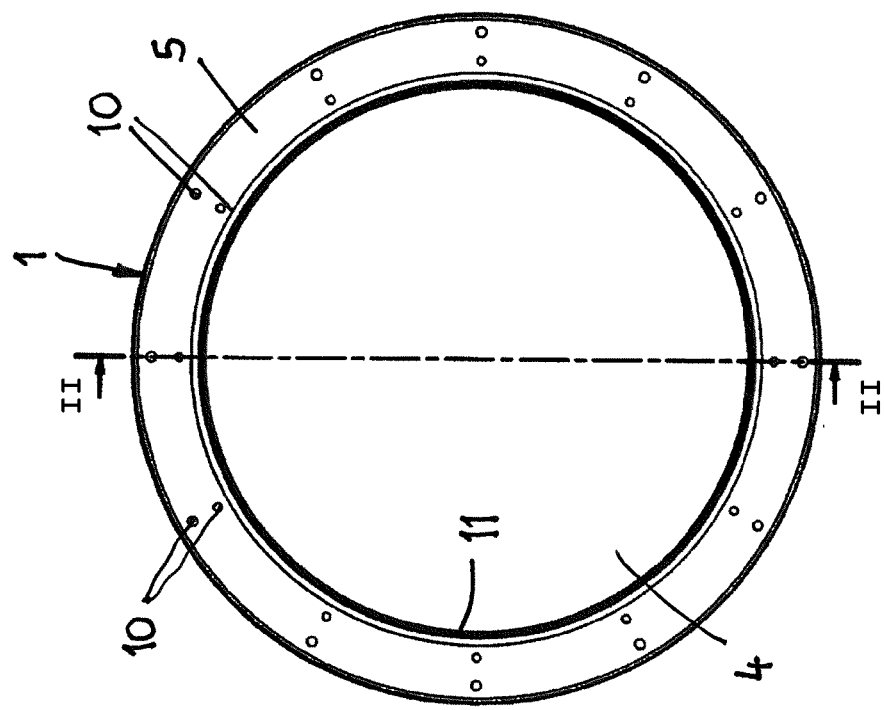
FIG. 1 shows a radial shaft seal according to the invention in an end view.

The cover 5 is fixedly connected in a suitable way to the housing 1, for example, with a corresponding binding system. For example, the connection can be realized by an adhesive. In case of an elastomeric material, the cover 5 can be vulcanized to the housing 1. It is advantageous when the cover 5 at the outer side of the housing bottom 3 is additionally connected with form fit to the bottom 3. The cover 5 at its outer side is provided with cutouts 10 (FIG. 1) distributed about its circumference which advantageously are distributed along two rings about the circumference of the housing bottom 3.

The radial shaft seal ring is provided with a sealing lip 11 which is comprised of elastomeric material and which, in the installed position, is resting under elastic deformation with a defined pretension against the shaft to be sealed. The sealing lip 11 is advantageously embodied as one piece together with the cover 5 and extends about the inner circumference of the housing 1. In principle, it is possible to provide the cover 5 and the sealing lip 11 as separate parts. This has the advantage that the sealing lip 11 can be produced of a different material than the cover 5.

The radial shaft seal ring can be provided with a protective lip (not illustrated) which is also advantageously embodied as one piece with the cover 5 and thus also with the sealing lip 11. The protective lip is then located at the air side 13 (FIG. 2) of the radial shaft seal ring and prevents an ingress of dirt particles and the like to the sealing lip 11.

In the installed position, the sealing lip 11 is resting with elastic deformation areally against the rotating shaft. In order to keep friction and thus wear as minimal as possible, the contact pressure or the specific radial force at which the sealing lip 11 is contacting the shaft is very minimal and is, for example, in a magnitude of approximately 0.01 to 0.3 N/mm.

The inner side 14 (FIG. 9) of the sealing lip 11 which is facing the shaft to be sealed is provided with a structure which will be explained in the following in detail.

At the free rim, at the inner side 14 of the sealing lip 11, a circumferential ring 15 is provided which is formed at the inner side 14 by a raised portion which is approximately semicircular in axial section. The ring 15 has a minimal spacing from the end face 16 of the sealing lip 11.

At the side which is facing away from the end face 16 of the sealing lip 11, a wall surface 17 adjoins the circumferential ring 15 (FIG. 9). Return units 18 are provided at the wall surface 17 and ensure that the medium, in general oil, that flows from the medium side 19 (FIG. 2) of the radial shaft seal ring underneath the sealing lip 11 is conveyed back to the medium side 19.

Figure 4:
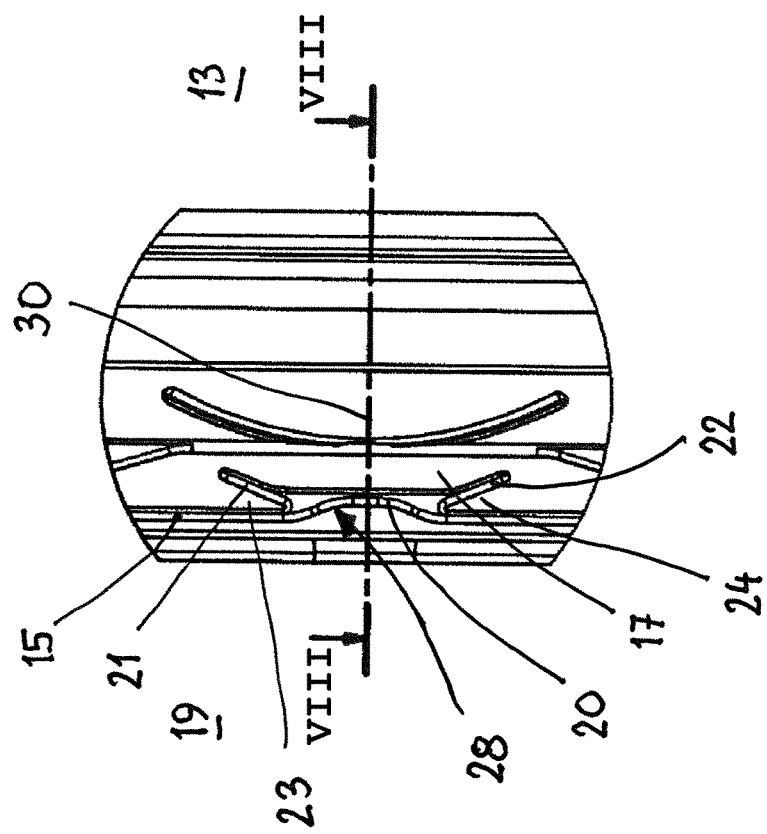
FIG. 4 shows the detail B in FIG. 2 in enlarged illustration.
Figure 6:
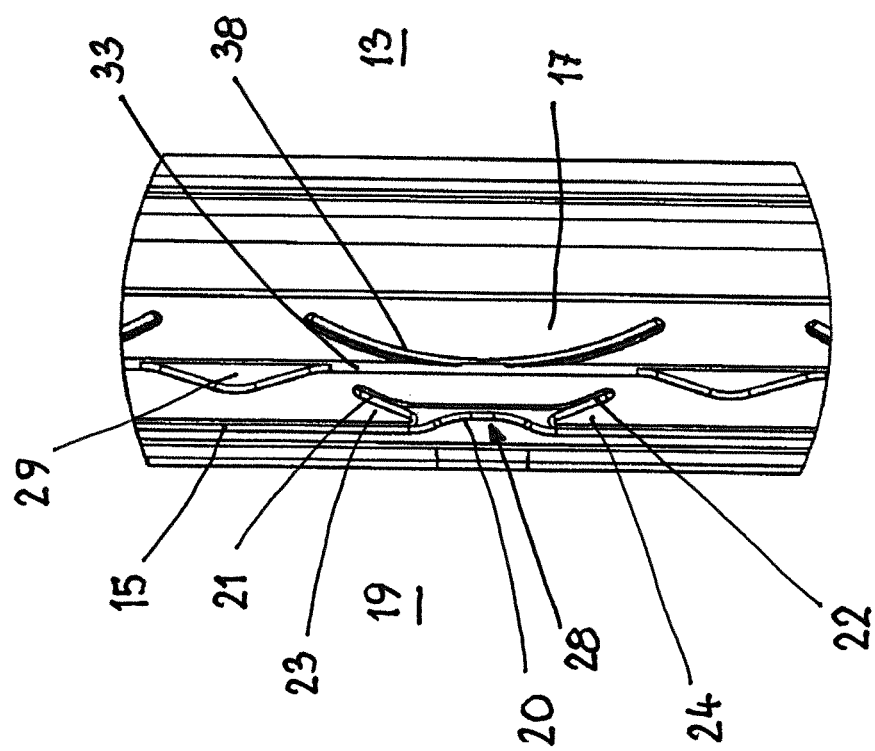
FIG. 6 shows the detail E in FIG. 2 in enlarged illustration.
Figure 5:
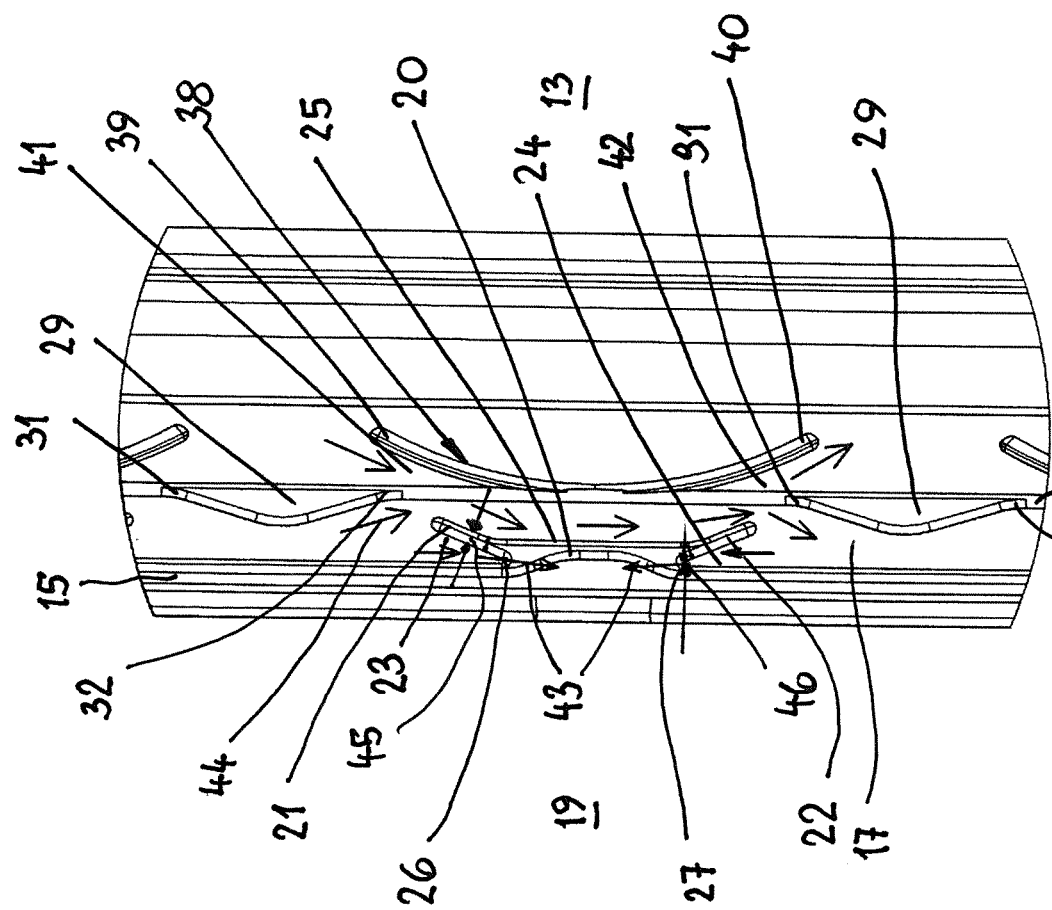
FIG. 5 shows the detail D in FIG. 2 in enlarged illustration.

The ring 15 comprises sections 20 which are positioned at a spacing to each other and form sickle-shaped depressions which have a curved extension (FIGS. 4, 5, and 6) pointing in direction toward the air side 13. The sections 20 are formed each mirror-symmetrical to the corresponding axial plane, as illustrated in FIG. 6. The sections 20 are formed as one piece together with the ring 15 but have a smaller width than the ring 15 (FIGS. 5 and 6).

The sections 20 can extend about their entire circumferential length with a continuous curvature. It is however also possible that the sections 20 have at half their length a straight central section. Depending on the configuration of the arc-shaped sections 20, it is possible to affect the return quality of the return units 18.

In the region in which the two ends of the sections 20 pass into the ring 15, return elements 21, 22 extending opposite to each other are provided which extend angularly in circumferential direction of the sealing lip 11. The sections 20 and the return elements 21, 22 form the return units 18.

The sections 20 and the return elements 21, 22, like the ring 15, are formed by raised portions which are projecting from the inner side 14 past the wall surface 17 of the sealing lip 11. The return elements 21, 22 are positioned at an acute angle relative to the neighboring regions of the ring 15 and delimit together with them V-shaped pressure chambers 23, 24, viewed in plan view according to FIGS. 4 to 6. In the circumferential direction, they taper in the direction toward the arc-shaped section 20 which extends between the two pressure chambers 23, 24. The return elements 21, 22 pass in an arc shape into the medium-side ring 15.

As illustrated in FIG. 5, the return elements 21, 22 are connected to each other by a narrow rib 25. It extends in circumferential direction and parallel to the medium-side ring 15. Advantageously, the rib 25 is formed as one piece together with the return elements 21, 22.

The arc-shaped section 20 is provided such that at half its length it has the smallest distance from the rib 25.

The arc-shaped sections 20 are distributed uniformly about the circumference of the sealing lip 11 (FIG. 2). In the described way, the return elements 21, 22 adjoin the sections 20 and delimit together with the neighboring regions of the medium-side ring 15 the pressure chambers 23, 24. The rounded tips 26, 27 of the pressure chambers 23, 24 at both ends of the section 20 are oriented toward each other.

The return unit 18 and the rib 25 form a return device 28. Accordingly, several such return devices 28 are provided at a spacing one after the other about the circumference of the sealing lip 11.

Figure 3:
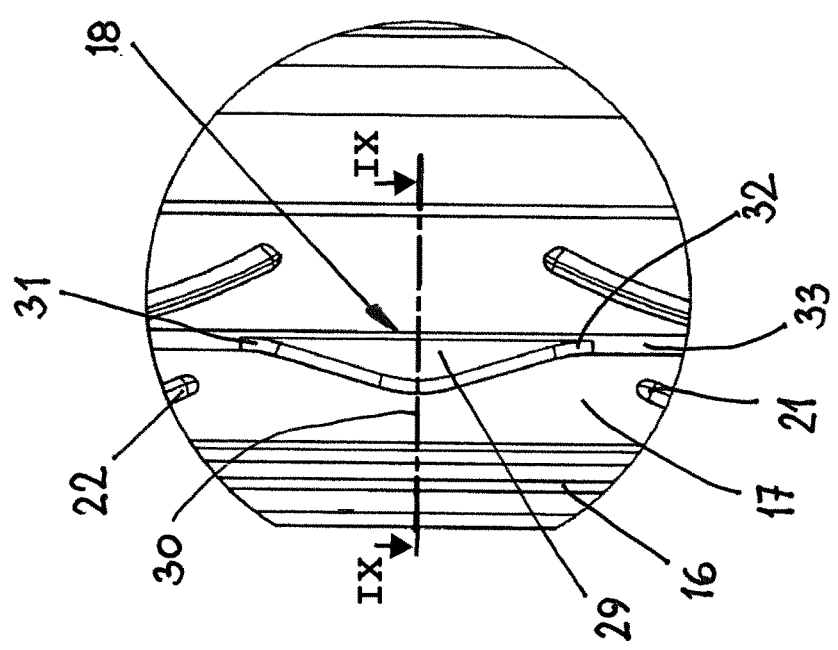
FIG. 3 shows the detail F in FIG. 2 in an enlarged illustration.

In the region between neighboring return devices 28, a raised guiding rib 29 is provided which is arranged at the inner side 14 of the sealing lip 11 and advantageously has the same height as the medium-side ring 15. The guiding rib 29 extends in circumferential direction of the sealing lip 11 and widens, beginning at its two ends. Advantageously, the guiding rib 29 is designed to be mirror symmetrical in relation to its transverse center plane 30 (FIG. 3).

Across its length, the guiding rib 29 has a spacing from the medium-side ring 15. Corresponding to the shape of the guiding rib 29, its spacing from the ring 15 at half its length is smallest while it is longest in the region of the two ends in circumferential direction.

The two ends 31, 32 are positioned approximately at the level of the free ends of the return elements 21, 22 of the neighboring return units 18. The free ends of the return elements 21, 22 have a minimal spacing from the ends 31, 32 of the guiding rib 29.

One such guiding rib 29 is arranged, respectively, between the return devices 28 neighboring in circumferential direction. It is formed respectively by a bulge of a ring 33 which is provided at the inner side 14 of the sealing lip 11 and extends coaxially to the medium-side ring 15. Between the rings 15 and 33, the return devices 28 are located.

The ring 33 which may have a curved outer side ensures the sealing function in the static state, when the shaft to be sealed is not rotating.

The rings 15, 33, the return units 18, and the guiding ribs 29 have preferably the same height (FIG. 9). In this way, it is ensured that the medium side 19 can be sealed properly by the ring 15. Medium that has nonetheless escaped underneath the ring 15 is returned by the return devices 28 and the guiding ribs 29 in a reliable way. The ring 33, which is resting seal-tightly in the installed position against the shaft, prevents that the medium from the medium side 19 can reach the air side 13.

In contrast to the rings 15, 33, the guiding rib 29 has a flat end face 36 (FIG. 9). Since the return devices 28 and the guiding ribs 29, viewed in a projection onto the drawing plane (FIG. 4), are embodied symmetrically to the respective center plane 30, they act optimally in both rotational directions. The medium which has reached a location underneath the sealing lip 11 is thus returned reliably to the medium side 19, independent of the rotational direction of the shaft.

The sections 20, the return elements 21 to 22 as well as the rib 25 have across their length a constant axial width (FIG. 5), respectively. In this way, a uniform return of the medium in both rotational directions of the shaft is realized.

The height of the sections 20 can be constant. It is also possible to design these sections 20 such that their height increases continuously from both ends so that the sections 20 have the greatest height at half their length.

The medium-side ring 15 has a minimal spacing from the end face 16 of the sealing lip 11. In the installed position, the end face 16 is positioned approximately at a right angle to the surface of the shaft. Approximately at the level of the medium-side ring 15, a circumferentially projecting ring 37 is provided at the surface of the sealing lip 11 (FIG. 9). It has advantageously a curved surface. In axial section (FIG. 9), the ring 37 is designed to be approximately semicircular. The ring 37 can contribute to an optimization of the contact force distribution and/or the magnitude of the contact force of the sealing lip 11.

In the illustrated and described embodiment, the return units 18 as well as the guiding ribs 29 are embodied symmetrical to the transverse center plane 30. However, it is in principle also possible to design the return devices 28 to be asymmetric, in deviation from the illustrated preferred embodiment. Such a configuration is beneficial when the shaft to be sealed has a main rotational direction in use. In this case, the return devices 28 and the guiding ribs 29 can be designed such that an optimal return action of the medium that has passed underneath the sealing lip 11 can be achieved in this main rotational direction. When the shaft then rotates in the other direction, the return action of the asymmetrically embodied return devices 28 and guiding ribs 29 is sufficient in this case.

At the side of the ring 33 which is facing the air side 13, additional (second) return elements 38 are provided which, in the illustrated embodiment, have a sickle shape and are advantageously embodied as one piece together with the ring 33. The second return elements 38 are located, viewed in circumferential direction, at the level of the sections 20 of the medium-side ring 15, respectively. The second return elements 38 adjoin approximately tangentially the side of the ring 33 facing the air side 13 (FIG. 5).

As can be seen in FIG. 5, the return elements 38 have a continuous curvature and adjoin at half their length the ring 33. The two ends 39, 40 are positioned approximately at the level of the ends 31, 32 of the guiding ribs 29 neighboring in circumferential direction.

The sickle-shaped return elements 38 increase the return efficiency of the radial shaft seal even for alternating rotational movement of the shaft.

The return elements 38 must not be embodied in a sickle shape but can also have the shape of angular momentum webs which in circumferential direction of the radial shaft seal have alternating slanted positions.

The return elements 38 are located in the air-side region of the sealing lip 11 resting against the shaft and are positioned in the installed state at a particular angle relative to the shaft which can amount to up to approximately 60°.

The number of return elements 38 is derived preferably from the number of the return units 18 or return devices 28 located at the medium side. They are arranged in the leading region of the sealing lip 11 resting against the shaft.

Between the ends 39, 40 of the return elements 38 and the neighboring ends 31, 32 of the guiding ribs 29 flow-through regions 41, 42 are formed through which the medium can flow in a way to be described in the following.

The flow-through regions 41, 42 taper respectively in the direction toward the ring 33.

Since the return elements 38 are arranged almost in extension to the return units 18 or return devices 28, viewed in axial direction, an additional active return of the medium is provided by means of the return elements 38 so that the pump action of the radial shaft seal is increased and brought to a very high level. In this way, the radial shaft seal can be used excellently in high speed applications.

In order to minimize noise which, for example, may occur in operation at very high rotational speeds, the length of the return elements 21, 22 and/or of the return elements 38 can be varied. The radial shaft seal is characterized therefore by an excellent noise reduction when in use. In addition, the radial shaft seal is constructively simple in its configuration and can be manufactured inexpensively.

It is further possible to arrange the return devices 28 and/or the return elements 38 in circumferential direction of the sealing lip 11 such that they adjoin each other immediately and not, as in the illustrated embodiment, at a minimal circumferential spacing relative to each other.

Upon use of the radial shaft seal, a hydrodynamic flow in the direction of the arrows illustrated in FIG. 5 is produced in the pressure chambers 23, 24 due to the medium to be sealed that has passed underneath the ring 15. Since the pressure chambers 23, 24 are tapering in flow direction, a pressure is generated in the pressure chambers 23, 24 that cause the ring 15 to be able to briefly lift off the shaft in the region of these pressure chambers so that the medium to be sealed can flow from the pressure chambers 23, 24 across the ring and back to the medium side 19. This conveyance back to the medium side 19 in the region of the pressure chambers 23, 24 is illustrated in FIG. 5 by the flow arrows 43.

The medium which is passing underneath the ring 15 flows in circumferential direction along the flow arrows 44 (FIG. 5) along the guiding ribs 29 and the medium-side ring 33. As illustrated in FIG. 5, this part of the medium flows in the region between the ring 33 and the ribs 25. The return elements 21, 22, which extend in the view according to FIG. 5 at an angle to the ring 33, end at a spacing relative to the ring 33 so that the medium can flow through between the return elements 21, 22 and the ring 33.

The medium that has passed underneath the ring 33 is caught in the flow regions 41, 42 and is guided underneath the ring 33 again in the direction to the medium side 19.

By widening the region 45 of the return elements 21, 22 in comparison to the region 46 at the transition of the return elements 21, 22 into the ring 15 (FIG. 5), the typical contact pressure distribution of sleeve seals can be counteracted. This has the result that leakage flow in the direction of the ring 33 is exposed to a higher resistance than the return of the medium in the direction of the flow arrows 43.

The widened portion 46 is provided at the transition from the return elements 21, 22 into the sections 20. In relation to the two widened portions 45, 46, reference is being had expressly to FIG. 5 in which these conditions are schematically illustrated.

The described radial shaft seal is characterized in that the sealing lip 11 at the medium side rim is provided with the circumferential ring 15 which comprises the sections 20 uniformly distributed about the circumference. They form recesses or depressions which are pointing toward the air side 13. The return elements in the form of the sections 21, 22 which produce alternating angular momentum are arranged centered relative to the recesses 20. The sections 20 end approximately tangentially at the ring 15. The ring 33 which is facing the air side 13 serves for securing the static sealing action. The return elements 38 which are arranged at the air side of the ring 33 are also uniformly distributed about the circumference of the radial shaft seal and are positioned respectively at the level of the return devices 28. The return elements 38 ensure that medium that has passed underneath the ring 15 and underneath the ring 33 is returned to the medium side 19. The interaction of the return devices 28 with the return elements 38 leads to an optimal active return action of the medium and thus a very high pump action of the radial shaft seal.

The guiding ribs 29 are also distributed about the circumference of the radial shaft seal. Their number corresponds to the number of the sections 20. The sections 20 and the guiding ribs 29, viewed in radial direction according to FIG. 5, are embodied to be oppositely curved relative to each other and are provided alternatingly in circumferential direction of the radial shaft seal.

The guiding ribs 29 form bulges and ensure that the medium which is not returned by one of the return elements 21, 22 is guided actively to the neighboring return element 21, 22. This additional active supply of medium to the return elements 21, 22 increases the return action to the medium side 19.

The ring 15 with the sections 20 configured as depressions reduces the disturbance of the flow direction of the medium to be sealed. Due to the inertia of the medium, the leakage flow is thus reduced. This is achieved inter alia in that the flow direction of the medium that is predetermined by the narrowest gap of the double-convergent gap formed by the pressure chambers 23, 24 is predetermined such that the medium, following the circumferential direction, reaches the medium side 19 without active deflection.

Moreover, the contact surface in the region of the potential leakage flow is enlarged. In this way, it is made difficult for a possibly existing leakage medium to move across the return elements 21, 22 in the direction toward the air side 13. The bulges located at the ring 33 in the form of the guiding ribs 29 guide possibly existing leakage flows in a targeted and active way back to the return elements 21, 22.

Medium which has possibly passed underneath the ring 33 is reliably returned by the return elements 38 at the air side 13 in the direction toward the medium side 19. The flow-through regions 41 into which the medium flows form pressure chambers that taper in the flow direction. In this way, a pressure is generated that leads to the ring 33 being able to lift briefly off the shaft in the region of these pressure chambers 41 so that the medium to be sealed can flow underneath the ring 33 back to the medium side 19.

In another rotational direction of the shaft, the flow-through regions 42 form the pressure chambers which taper in the flow direction of the medium. The pressure which is produced in this way thus also leads to the ring 33 in the region of these pressure chambers 42 to briefly lift off the shaft and enable the medium to flow back to the medium side 19.

The radial shaft seal can be used in all fast rotating applications and for changing rotational directions of a shaft. The shaft to be sealed can have high rotational speeds as well as correspondingly high circumferential speeds. Alternating rotational directions between medium side 19 and the air side 13 are sealed reliably. The main field of application is the use in the high speed field, preferably in electromobility for sealing transmission shafts or motor shafts. In this context, the rotational speeds of the shaft can be, for example, in the range of 10,000 rpm to approximately 50,000 rpm.

The radial shaft seal can basically be used also for low rotational speeds. Even in the range of the starting rotational speed, the radial shaft seal provides for a proper sealing action.

In deviation from the illustrated embodiment, the radial shaft seal can be also designed such that it is integrated, for example, into a sealing flange. In this case, the radial shaft seal does not need its own housing. For example, the sealing lip can be glued to the sealing flange, vulcanized thereto or fastened in any other suitable way.

The specification incorporates by reference the entire disclosure of German priority document 10 2019 002 953.4 having a filing date of Apr. 18, 2019.

While specific embodiments of the invention have been shown and described in detail to illustrate the inventive principles, it will be understood that the invention may be embodied otherwise without departing from such principles.

What is claimed is:

1. A radial shaft seal comprising:
   at least one sealing lip comprised of elastomeric material and comprising an inner side facing a shaft to be sealed, the at least one sealing lip comprising:
   a first circumferential ring arranged at the inner side, the first circumferential ring configured to rest sealtightly against the shaft to be sealed and configured to seal relative to a medium side of the radial shaft seal;
   first return elements arranged about a circumference of the at least one sealing lip and arranged at a side of the first circumferential ring facing an air side of the radial shaft seal, the first return elements configured to return leakage medium, independent of the rotational direction of the shaft to be sealed, to the medium side; and
   a second circumferential ring arranged at the inner side at the side of the first circumferential ring facing the air side of the radial shaft seal;
   second return elements arranged at a side of the second circumferential ring that is facing the air side of the radial shaft seal;
   bulges arranged at a side of the second circumferential ring facing the medium side of the radial shaft seal, wherein the bulges are curved so as to bulge in an axial direction of the radial shaft seal toward the first circumferential ring and are configured to guide leakage medium, independent of the rotational direction of the shaft to be sealed, to the first return elements.

2. The radial shaft seal according to claim 1, wherein the second return elements are positioned in a circumferential direction of the at least one sealing lip approximately at a level of the first return elements.

3. The radial shaft seal according to claim 2, wherein the second return elements extend at least partially at a slant relative to the circumferential direction of the at least one sealing lip.

4. The radial shaft seal according to claim 1, wherein the second return elements are sickle-shaped.

5. The radial shaft seal according to claim 1, wherein the second return elements adjoin approximately tangentially the second circumferential ring.

6. The radial shaft seal according to claim 1, wherein the second return elements are embodied as one piece together with the second circumferential ring.

7. The radial shaft seal according to claim 1, wherein each one of the second return elements delimits, together with a neighboring region of the second circumferential ring, pressure chambers.

8. The radial shaft seal according to claim 7, wherein the pressure chambers of the second return elements are positioned at a spacing one after the other in the circumferential direction of the at least one sealing lip.

9. The radial shaft seal according to claim 7, wherein the pressure chambers of each one of the second return elements taper in a direction toward each other.

10. The radial shaft seal according to claim 1, wherein the second return elements are raised portions at the inner side of the at least one sealing lip.

11. The radial shaft seal according to claim 1, wherein the second return elements are mirror-symmetrical relative to an axial plane of the radial shaft seal.

12. The radial shaft seal according to claim 1, wherein the second return elements and the first return elements are spaced apart from each other in the axial direction of the radial shaft seal.

13. The radial shaft seal according to claim 1, wherein the first return elements and the second return elements extend approximately parallel to each other.

14. The radial shaft seal according to claim 1, wherein the second circumferential ring comprises the bulges, wherein the bulges are distributed about a circumference of the second circumferential ring.

15. A radial shaft seal comprising:
at least one sealing lip comprised of elastomeric material and comprising an inner side facing a shaft to be sealed, the at least one sealing lip comprising:
a first circumferential ring arranged at the inner side, the first circumferential ring configured to rest seal-tightly against the shaft to be sealed and configured to seal relative to a medium side of the radial shaft seal;
first return elements arranged about a circumference of the at least one sealing lip and arranged at a side of the first circumferential ring facing an air side of the radial shaft seal, the first return elements configured to return leakage medium, independent of the rotational direction of the shaft to be sealed, to the medium side; and
a second circumferential ring arranged at the inner side at the side of the first circumferential ring facing the air side of the radial shaft seal;
second return elements arranged at a side of the second circumferential ring that is facing the air side of the radial shaft seal;
wherein the first circumferential ring comprises sickle-shaped depressions distributed about a circumference of the first circumferential ring, wherein the sickle-shaped depressions extend in an axial direction of the radial shaft seal away from the circumference of the first circumferential ring toward the second circumferential ring and are positioned approximately between neighboring first return elements.

16. A radial shaft seal comprising:
at least one sealing lip comprised of elastomeric material and comprising an inner side facing a shaft to be sealed, the at least one sealing lip comprising:
a first circumferential ring arranged at the inner side, the first circumferential ring configured to rest seal-tightly against the shaft to be sealed and configured to seal relative to a medium side of the radial shaft seal;
first return elements arranged about a circumference of the at least one sealing lip and arranged at a side of the first circumferential ring facing an air side of the radial shaft seal, the first return elements configured to return leakage medium, independent of the rotational direction of the shaft to be sealed, to the medium side; and
a second circumferential ring arranged at the inner side at the side of the first circumferential ring facing the air side of the radial shaft seal;
second return elements arranged at a side of the second circumferential ring that is facing the air side of the radial shaft seal;
bulges arranged at a side of the second circumferential ring facing the medium side of the radial shaft seal, wherein the bulges are curved so as to bulge in an axial direction of the radial shaft seal toward the first circumferential ring;
wherein the first circumferential ring comprises depressions distributed about a circumference of the first circumferential ring, wherein the depressions are curved opposite to the bulges so as to extend in the axial direction of the radial shaft seal away from the circumference of the first circumferential ring toward the second circumferential ring and are positioned approximately between neighboring first return elements;
wherein the bulges and the depressions are arranged alternatingly along a circumferential direction of the at least one sealing lip.

17. The radial shaft seal according to claim 14, wherein free ends of the first return elements have a minimal spacing relative to the bulges.

18. A radial shaft seal comprising:
at least one sealing lip comprised of elastomeric material and comprising an inner side facing a shaft to be sealed, the at least one sealing lip comprising:
a first circumferential ring arranged at the inner side, the first circumferential ring configured to rest seal-tightly against the shaft to be sealed and configured to seal relative to a medium side of the radial shaft seal;
first return elements arranged in a circumferential direction about a circumference of the at least one sealing lip and arranged at a side of the first circumferential ring facing an air side of the radial shaft seal, the first return elements configured to return leakage medium, independent of the rotational direction of the shaft to be sealed, to the medium side;
a second circumferential ring arranged at the inner side at the side of the first circumferential ring facing the air side of the radial shaft seal;
second return elements arranged at a side of the second circumferential ring that is facing the air side of the radial shaft seal;
wherein the first return elements and the second return elements are arranged about the circumference of the at least one sealing lip at a same circumferential level when viewed in an axial direction of the radial shaft seal, respectively;
wherein the first return elements are arranged alternatingly at an oppositely oriented slant relative to the circumferential direction;
wherein the second return elements each comprise oppositely oriented sections, wherein the oppositely oriented sections are slanted oppositely to the circumferential direction and point away from each other.

19. A radial shaft seal comprising:
at least one sealing lip comprised of elastomeric material and comprising an inner side facing a shaft to be sealed, the at least one sealing lip comprising:
a first circumferential ring arranged at the inner side, the first circumferential ring configured to rest seal-tightly against the shaft to be sealed and configured to seal relative to a medium side of the radial shaft seal;
first return elements arranged in a circumferential direction about a circumference of the at least one sealing lip and arranged at a side of the first circumferential ring facing an air side of the radial shaft seal, the first return elements configured to return leakage medium, independent of the rotational direction of the shaft to be sealed, to the medium side;
a second circumferential ring arranged at the inner side at the side of the first circumferential ring facing the air side of the radial shaft seal;
second return elements arranged at a side of the second circumferential ring that is facing the air side of the radial shaft seal;
wherein the first circumferential ring comprises sickle-shaped depressions and straight sections distributed alternatingly about a circumference of the first circumferential ring, wherein the sickle-shaped depressions each have opposed ends passing into the straight sections, wherein the sickle-shaped depressions each extend in an axial direction of the radial shaft seal away from the circumference of the first circumferential ring toward the second circumferential ring;

wherein the sickle-shaped depressions are arranged between the first return elements such that the first return elements are arranged at the opposed ends of the sickle-shaped depressions, respectively;

wherein the first return elements each are positioned at an acute angle relative to the straight sections and delimit together with the straight sections a pressure chamber, respectively, wherein the first return elements are arranged alternatingly at an oppositely oriented slant relative to the circumferential direction.

\* \* \* \* \*